(12) United States Patent
Fujimoto et al.

(10) Patent No.: US 8,012,237 B2
(45) Date of Patent: Sep. 6, 2011

(54) PROCESS FOR PRODUCING MOLTEN IRON

(75) Inventors: Hideaki Fujimoto, Kobe (JP); Tsuyoshi Mimura, Kakogawa (JP); Takao Harada, Kobe (JP); Masataka Tateishi, Kobe (JP); Kiminori Hajika, Kobe (JP); Hiroshi Sugitatsu, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/679,128

(22) PCT Filed: Sep. 18, 2008

(86) PCT No.: PCT/JP2008/066875
§ 371 (c)(1),
(2), (4) Date: Mar. 19, 2010

(87) PCT Pub. No.: WO2009/038140
PCT Pub. Date: Mar. 26, 2009

(65) Prior Publication Data
US 2010/0229685 A1 Sep. 16, 2010

(30) Foreign Application Priority Data
Sep. 19, 2007 (JP) .................................. 2007-242650

(51) Int. Cl.
*C21C 5/35* (2006.01)
*C21C 7/076* (2006.01)
*C21C 5/54* (2006.01)

(52) U.S. Cl. ................. 75/504; 75/522; 75/569; 75/584

(58) Field of Classification Search .................... 75/522, 75/504, 569, 584
See application file for complete search history.

(56) References Cited

U.S. PATENT DOCUMENTS
4,076,954 A * 2/1978 Linder .................... 75/10.38
4,087,274 A * 5/1978 Edenwall et al. ............ 75/10.17
4,851,039 A * 7/1989 Papst et al. ................. 75/10.15
(Continued)

FOREIGN PATENT DOCUMENTS
JP  54 119316  9/1979
(Continued)

OTHER PUBLICATIONS
Office Action issued Mar. 10, 2011, in Japanese Patent Application No. 200880105857.2 filed on Sep. 18, 2008.

*Primary Examiner* — George Wyszomierski
*Assistant Examiner* — Tima M McGuthry-Banks
(74) *Attorney, Agent, or Firm* — Oblon, Spivak, McClelland, Maier & Neustadt, L.L.P.

(57) ABSTRACT

A process for producing molten iron is a process in which while an inert gas is blown into a molten iron layer in an iron bath type melting furnace through bottom-blown tuyeres provided in a hearth bottom thereof to stir the molten iron layer, a carbon material, an additive flux, and solid reduced iron obtained by heating reduction of carbon composite iron oxide briquettes are charged into the above melting furnace, and top blowing of an oxygen-containing gas is performed through a top-blown lance provided for the melting furnace, so that the solid reduced iron is melted by combustion heat obtained by combusting the carbon material and/or carbon in molten iron to form molten iron.

7 Claims, 3 Drawing Sheets

U.S. PATENT DOCUMENTS

| | | | |
|---|---|---|---|
| 5,078,785 A * | 1/1992 | Ibaraki et al. | 75/386 |
| 6,171,364 B1 * | 1/2001 | Sarma et al. | 75/382 |
| 2004/0168549 A1 | 9/2004 | Kobayashi et al. | |
| 2006/0021469 A1 | 2/2006 | Ito et al. | |

FOREIGN PATENT DOCUMENTS

| | | |
|---|---|---|
| JP | 61 213310 | 9/1986 |
| JP | 62 23848 | 2/1987 |
| JP | 62 243707 | 10/1987 |
| JP | 62 247013 | 10/1987 |
| JP | 62 247014 | 10/1987 |
| JP | 5 239521 | 9/1993 |
| JP | 8 209218 | 8/1996 |
| JP | 2001 241859 | 9/2001 |
| JP | 2004 176170 | 6/2004 |
| JP | 2004 183070 | 7/2004 |
| JP | 2006 257545 | 9/2006 |

* cited by examiner

PROCESS FOR PRODUCING MOLTEN IRON

This application is a national stage entry of PCT/JP08/66875 filed Sep. 18, 2008.

TECHNICAL FIELD

The present invention relates to a process for producing molten iron by melting solid reduced iron. In more particular, the present invention relates to a process for producing molten iron by melting solid reduced iron in an iron bath type melting furnace, the solid reduced iron being obtained by heating reduction of carbon composite iron oxide briquettes in a rotary hearth furnace or the like.

BACKGROUND ART

The applicant of the present invention proposed a process for producing molten iron as a new iron making process instead of a conventional blast furnace process and a smelting reduction process. In this process for producing molten iron in which a rotary hearth furnace and a iron bath type melting furnace are used in combination, after carbon composite iron oxide briquettes each containing an iron oxide source and a carbonaceous reducing agent are processed by heating reduction in the rotary hearth furnace to form solid reduced iron, this solid reduced iron is fed to the iron bath type melting furnace, and a carbon material supplied as a fuel is combusted with oxygen in the iron bath type melting furnace, so that the solid reduced iron is melted to form molten iron (see Patent Documents 1 and 2).

However, through subsequent investigation carried out by the inventors of the present invention, it was found that in the iron bath type melting furnace, since a large amount of molten slag (hereinafter simply referred to as "slag" in some cases) is produced which is derived from gangue components in the iron oxide source and ashes of the carbonaceous reducing agent and the carbon material, when abnormal foaming of this large amount of slag once occurs in the furnace, it is difficult to suppress this slag foaming, and because of this slag foaming, slag and/or base metal gushes out of the furnace. As a result, yield loss and/or operation interruption may occur, an exhaust gas system may be blocked by slag and/or base metal which is carried therein, and in addition, since the heat capacitance of slag which is light-weighted by the above foaming is small, the slag is cooled and solidified when it is discharged, so that a taphole is disadvantageously clogged thereby.

In addition, as a process for melting scrap in a top-blown converter type reaction furnace by heat generated when a carbon material is combusted using an oxygen gas, a process has been disclosed in which after scrap is smelted, the total amount of produced molten iron is discharged by tilting the furnace while the total or at least 50% of slag is allowed to remain therein, and molten iron is charged into the furnace for next charge (see Patent Document 3).

However, according to this process, since the furnace must be tilted for each charge, besides the outflow of the molten iron and the carbon material caused by the tilting, heat dissipation loss is also increased, and hence the productivity of molten iron is disadvantageously decreased.

In addition, as a process for continuously producing molten iron from scrap and/or iron ore using a cylindrical furnace, the following process has been disclosed. Accordingly to this process, when a low-fluidity slag having a low basicity is formed in melting, only molten iron is discharged from a discharge port in molten iron discharge, and the low-fluidity slag remains in the furnace. Subsequently, when the amount of the slag accumulated in the furnace reaches a value limit by repeatedly performing the above molten iron discharge operation, the basicity and/or the temperature of the slag is increased to increase the fluidity thereof, and the slag is then discharged (see Patent Document 4).

According to the process for producing a molten iron described above, since tilting of the furnace is not performed, and slag separation is performed without providing an additional slag discharge port, the stability of continuous operation and the improvement of iron yield can be obtained. However, since a large amount of slag is allowed to remain in the furnace for a long period of time, when an oxygen jet flow passes through a slag layer having a large thickness, the slag is oxidized to form peroxide slag, and abnormal foaming and bumping are liable to occur. As a result, blowing may be inevitably interrupted, and stable melting operation may not be continuously performed in many cases. In particular, since having a small apparent density, reduced iron is liable to stay in a slag layer having a large thickness, and hence bumping is facilitated by air bubbles (hereinafter referred to as "CO gas bubbles" in some cases) of carbon monoxide gas generated in the melting. In addition, when the basicity and the temperature of slag are changed between the melting and the slag discharge, the control becomes very complicated. Furthermore, when a large amount of slag is present, since a carbon material is not likely to reach a molten iron surface, carburization of molten iron by the carbon material is inhibited, and as a result, production of molten iron becomes difficult.

In addition, as a process for improving discharge of molten iron and slag, a process has been disclosed in which heating is performed by induction coils which are wound around a hearth bottom of a blast furnace and that of a blast furnace type melting furnace, and the temperatures of the hearth bottom, molten iron discharge port, and slag discharge port are increased (see Patent Document 5).

However, according to this process, since an expensive induction heating apparatus is additionally required in order to increase the temperature of slag, cost of equipment is increased, and in addition, labor hours for maintenance are also disadvantageously increased.

Patent Document 1: Japanese Unexamined Patent Application Publication No. 2004-176170
Patent Document 2: Japanese Unexamined Patent Application Publication No. 2006-257545
Patent Document 3: Japanese Unexamined Patent Application Publication No. 8-209218
Patent Document 4: Japanese Unexamined Patent Application Publication No. 5-239521
Patent Document 5: Japanese Unexamined Patent Application Publication No. 2001-241859

DISCLOSURE OF INVENTION

The present invention has been conceived in consideration of the problems described above, and in a process for producing molten iron in which solid reduced iron obtained by heating reduction of carbon composite iron oxide briquettes is melted in an iron bath type melting furnace by combustion heat of a carbon material using an oxygen-containing gas to form molten iron, an object of the present invention is to provide a process for producing molten iron in which abnormal foaming of slag is not generated in the furnace, and slag generated by the above melting operation is reliably discharged without tilting the furnace.

The present invention relates to a process for producing molten iron which comprises the steps of: while an inert gas is blown into a molten iron layer in an iron bath type melting furnace through bottom-blown tuyeres provided in a hearth bottom thereof to stir the molten iron layer, charging solid reduced iron, a carbon material, and an additive flux into the melting furnace, the solid reduced iron being obtained by heating reduction of carbon composite iron oxide briquettes, and performing top blowing of an oxygen-containing gas through a top-blown lance provided for the melting furnace, so that molten iron is produced by melting the solid reduced iron by combustion heat generated by combusting the carbon material and/or carbon in molten iron. In the process described above, the carbon material is charged so as to form a carbon material suspension slag layer in which the carbon material is suspended at an upper layer portion of a slag layer formed of slag generated when the solid reduced iron on the molten iron layer is melted into molten iron and further so as to form a carbon material covering layer made of only the carbon material on the carbon material suspension slag layer, and the molten iron and the slag accumulated in the melting furnace are discharged through a taphole provided at a lower portion of a furnace side of the melting furnace.

The object, features, aspects, and advantages of the present invention will become more apparent from the following detailed description and drawings.

BEST MODES FOR CARRYING OUT THE INVENTION

Hereinafter, an iron bath type melting furnace used for a process for producing molten iron according to an embodiment of the present invention will be described in detail with reference to the drawings, and in addition, the process for producing molten iron according to an embodiment of the present invention will be separately described in detail by a step in which solid reduced iron, a carbon material, and an additive flux are charged into the melting furnace and are then blown to melt the solid reduced iron so as to form a molten iron layer, a slag layer, and a carbon-material covering layer (hereinafter referred to as "melting step" in some cases); a step in which molten iron and slag produced in the melting step are discharged from the melting furnace (hereinafter referred to as "slag discharge step" in some cases); and a step which is performed when the melting furnace is repaired (hereinafter referred to as "repair step" in some cases).

[Structure of Iron Bath Type Melting Furnace]

Figure 1:
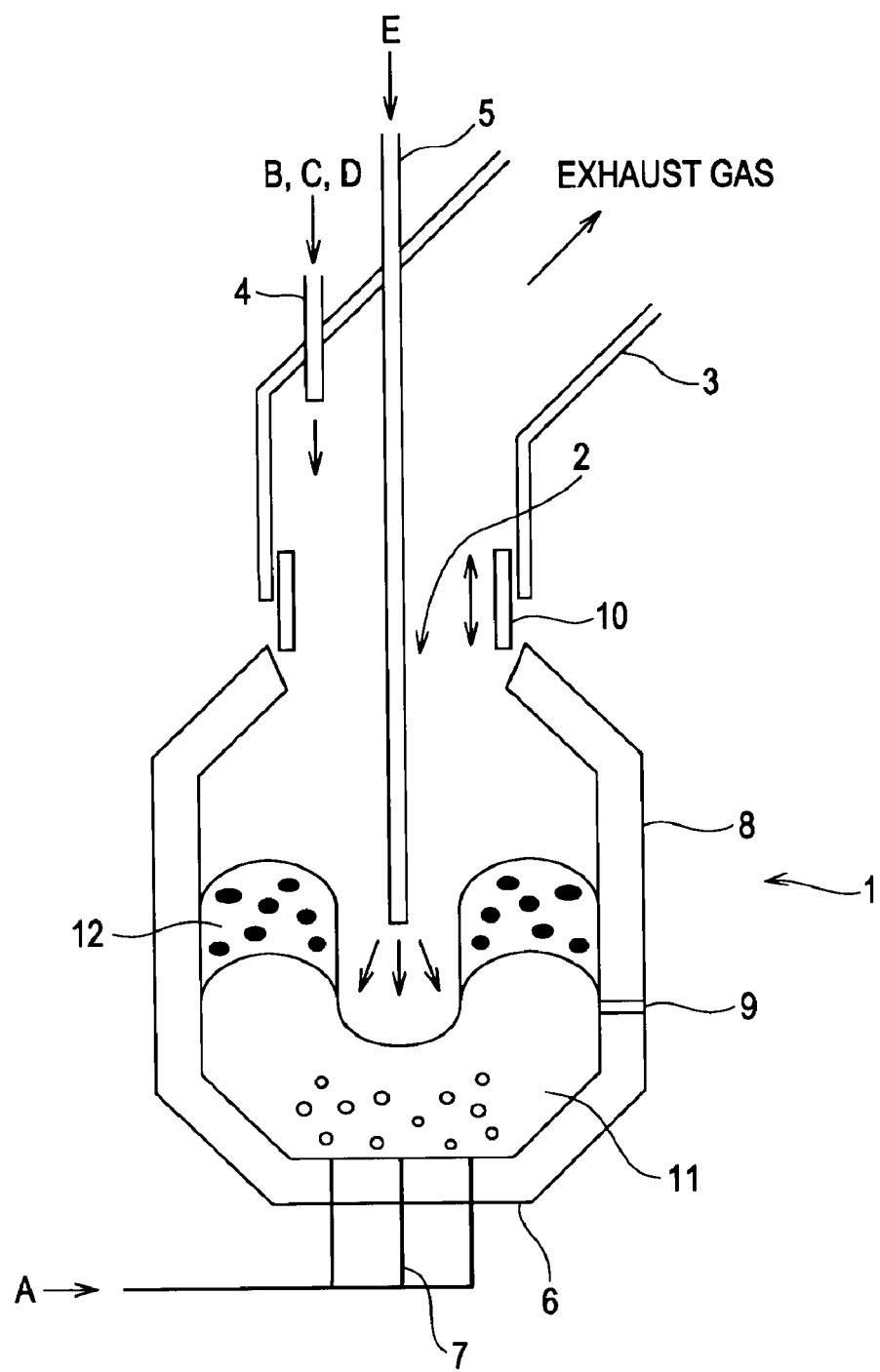
FIG. 1 is a vertical cross-sectional view showing a schematic structure of an iron bath type melting furnace according to an embodiment.

FIG. 1 shows a schematic structure of an iron bath type melting furnace according to one embodiment of the present invention. An iron bath type melting furnace 1 according to this embodiment is a vertical reaction furnace, and an exhaust gas duct 3 is connected to a top of furnace 2 located at an upper part of the iron bath type melting furnace 1. The iron bath type melting furnace 1 is provided with a raw-material charging chute 4 which is inserted into the furnace through the top of furnace 2 when raw materials are charged and a top-blown lance 5 which is inserted into the furnace through the top of furnace 2 in blowing. In addition, a plurality of bottom-blown tuyeres 7 are provided in a hearth bottom 6, and a taphole 9 is provided at a lower portion of a furnace side 8. The raw-material charging chute 4 is used to charge a solid reduced iron B, a carbon material C, and/or an additive flux D, which are raw materials. The taphole 9 is used to discharge molten iron (that is, molten iron discharge) and to discharge slag (that is, slag discharge).

The connection between the exhaust gas duct 3 and the top of furnace 2 of the iron bath type melting furnace (hereinafter simply referred to as "furnace" in some cases) 1 is preferably performed in such a way that a skirt 10 which is provided movably up and down at a lower end portion of the exhaust gas duct 3 covers an upper side of the top of furnace 2 so as not to be in close contact therewith. Accordingly, when the pressure inside the furnace changes, a gap with the top of furnace 2 is adjusted by moving the skirt 10 up and down so as to discharge part of a furnace gas to the air or introduce air into the furnace through the gap, and as a result, the change in pressure inside the furnace can be suppressed; hence, the generation of slag foaming caused by the change in pressure inside the furnace can be more reliably prevented. In addition, as described later, in the case in which an exhaust gas is effectively used as a fuel gas, the calorie of the exhaust gas may be decreased when air is introduced; however, when the control is performed in such a way that the pressure inside the furnace is stabilized within a short period of time by introduction of air, and the amount of air introduced into the exhaust gas is automatically decreased, the decrease in calorie of the exhaust gas may not substantially cause a problem, and a high calorie exhaust gas can be stably recovered.

In addition, by using the connection method in which the skirt 10 movable up and down is used, even if the slag overflows from the top of furnace 2 by abnormal foaming of slag, the slag spills outside only through the gap between the skirt 10 and the top of furnace 2, and hence an effect of avoiding serious equipment damages, such as damage done to an exhaust gas system and clogging thereof, can also be obtained.

In addition, the exhaust gas duct is preferably provided, for example, with a waste heat boiler not shown in the figure to recover sensible heat of a high-temperature exhaust gas, and since an exhaust gas obtained after the recovery of sensible heat contains a carbon monoxide gas (hereinafter referred to as "CO gas" in some cases) at a high concentration, it is preferable that this exhaust gas is effectively used as a fuel gas after dust removal.

[Melting Step]

While a molten iron layer 11 is stirred by blowing an inert gas A, such as a nitrogen gas, through the tuyeres 7 into the molten iron layer 11 made of molten iron which is accumulated in the iron bath type melting furnace 1 as a hot heel, the solid reduced iron B obtained by heating reduction of carbon composite iron oxide briquettes in a rotary hearth furnace not shown in the figure is charged into the iron bath type melting furnace 1 from an upper portion thereof with the carbon material C, such as coal, and the additive flux D, such as calcined lime or dolomitic quicklime, through the raw-material charging chute 4 which is a dropping method using, for example, the gravity. In addition, top blowing of an oxygen-containing gas E, such as an oxygen gas, is performed through the top-blown lance 5, so the carbon material C is combusted. By this combustion heat, the solid reduced iron B is melted, and the molten iron 11 is produced. At this stage, the slag is also produced. In addition, unreduced iron oxide (FeO and the like) remains in the solid reduced iron B, and this unreduced iron oxide is reduced into metal iron (Fe) and generates a gas by a reaction shown by FeO+C→Fe+CO or the like using soluble carbon in the molten iron layer 11 which will be described later and a carbon component in the carbon material C as a reducing agent.

As the solid reduced iron B, solid reduced iron may be used which is obtained by heating reduction of carbon composite iron oxide briquettes formed by briquetting a powdered mixture of an iron oxide source, such as iron ore or steel plant dust, and a carbonaceous reducing agent, such as coal, in a movable heating reduction furnace, such as rotary hearth furnace.

In accordance with the distance between the installation position of the rotary hearth furnace not shown in the figure and that of the iron bath type melting furnace 1, the solid reduced iron B at a high temperature produced in the rotary hearth furnace may be charged into the iron bath type melting furnace 1 without being substantially cooled, or alternatively, after being cooled to room temperature, the solid reduced iron B produced in the rotary hearth furnace not shown in the figure may be charged into the iron bath type melting furnace 1. In addition, in order to decrease the carbon material consumption of the iron bath type melting furnace 1, a solid reduced iron B having a metallization ratio of preferably 60% or more, more preferably 80% or more, and even more preferably 90% or more, which has a melting heat quantity similar to that of scrap, is used. In addition, according to the present invention, even when the generation amount of a CO gas in melting is large by using a solid reduced iron B having a small metallization ratio, blowing can be performed while the slag is suppressed from swelling; hence, according to the present invention, a solid reduced iron B having a small metallization ratio can also be used without causing any problems.

In addition, as an iron source other than the solid reduced iron B, at least one selected from scrap, pig iron, mill scale, reduced iron by gas reduction, and the like can be charged into the iron bath type melting furnace 1. The iron source other than the solid reduced iron B may be charged simultaneously with the solid reduced iron B or may be separately charged before or after the solid reduced iron B is charged. In order to stably produce molten iron, with or without the carbon material C and the additive flux D, the solid reduced iron B and another iron source may be charged in advance using a scrap chute or the like and/or may be additionally charged in the blowing.

Figure 2:
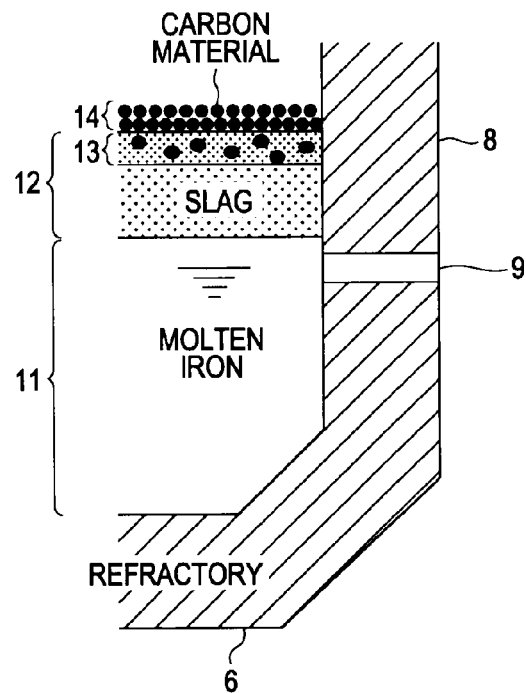
FIG. 2 is a vertical cross-sectional view schematically showing a distribution condition of a carbon material in the vicinity of a slag layer in an iron bath type melting furnace.

In the process for producing molten iron according to the embodiment of the present invention, the charge timing and the charge amount of the carbon material C are adjusted so that as shown in a schematic view of FIG. 2, at an upper layer portion of a molten slag layer 12 formed on the molten iron layer 11, a carbon material suspension slag layer 13 is formed in which the carbon material C is partly suspended, and on this carbon material suspension slag layer 13, a carbon material covering layer 14 made of only the carbon material C is further formed.

Since the carbon material suspension slag layer 13 is formed at the upper layer portion of the slag layer 12, the iron oxide concentration of the slag in the carbon material suspension slag layer 13 is decreased, the generation rate of CO gas bubbles causing the foaming is decreased, and in addition, the CO gas bubbles are likely to be released from the slag layer 12 by the carbon material present in the slag, so that the foaming is unlikely to occur.

Furthermore, since the carbon material covering layer 14 is formed on the carbon material suspension slag layer 13, the temperature of the slag layer 12 is maintained by the carbon material covering layer 14, and the slag is prevented from being cooled and solidified in the taphole 9 in the slag discharge. Hence, a smooth and rapid slag discharge operation can be performed without tilting the furnace and causing the outflow of the carbon material, and as a result, a process for producing molten iron having superior stability and productivity can be realized.

In order to more reliably obtain the effect described above, before the solid reduced iron B and the additive flux D are charged, only the carbon material C is preferably charged into the iron bath type melting furnace 1 in which molten iron is accumulated as a hot heel. The reason for this is that since the carbon material C present on the molten iron layer 11 is suspended at the upper layer of the molten slag layer 12 immediately from the initial melting stage of the solid reduced iron B, the carbon material suspension slag layer 13 is more reliably formed.

In order to more reliably obtain the effect described above, at the start of the molten iron discharge (discharge of molten iron), the total amount of the carbon material in the carbon material suspension slag layer 13 and that of the carbon material covering layer 14 (that is, the amount of the carbon material remaining in the furnace) is preferably set in the range of 100 to 1,000 kg per 1,000 kg of the slag in the molten slag layer 12. The reasons for this are that when it is 100 kg or more, since the thickness of the carbon material covering layer 14 is increased as the amount of the carbon material in the carbon material suspension slag layer 13 is increased, the effect of preventing the foaming and the effect of facilitating a smooth and rapid slag discharge operation are enhanced, and on the other hand, when it is 1,000 kg or less, since the incorporation of the slag by the carbon material of the carbon material covering layer 14 and the integration of the carbon material (carbon material covering layer 14) caused by heating are suppressed, the slag layer 12 is sufficiently stirred, so that the melting rate of the solid reduced iron B into the molten iron layer 11 is not decreased. The total amount of the carbon material per 1,000 kg of slag in the molten slag layer 12 is preferable in the range of 150 to 500 kg and particularly preferable in the range of 200 to 300 kg.

In this case, the amount of the carbon material remaining in the furnace can be calculated, for example, by subtracting the total amount of the carbon material used for reducing the unreduced iron oxide in the solid reduced iron, that used for carburization of the produced molten iron, that combusted by the top-blown oxygen gas, and that scattered as dust in the exhaust gas from the amount of the carbon material charged into the furnace. In addition, the slag amount in the molten slag layer 12 can be calculated, for example, in such a way that a produced slag amount is calculated from the gangue amount in the solid reduced iron, the ash amount in the carbon material, and the amount of the additive flux, which are charged into the furnace, and the discharged slag amount is subtracted from this produced slag amount.

When the particle size of the carbon material C charged into the iron bath type melting furnace 1 is too small, the carbon material C is liable to be scattered in the exhaust gas, and on the other hand, when the particle size is too large, the iron oxide concentration of the slag layer 12 is not sufficiently decreased, and the carburization rate into the molten iron layer 11 is decreased; hence, the average particle size is preferably in the range of 2 to 20 nm and is more preferably in the range of 3 to 15 nm.

As the carbon material C, besides coal, for example, coke, oil coke, charcoal, wood chips, waste plastics, old tires, and the like may be charged, and in addition to that, a floor carbon material (including a charred material) used for a rotary hearth furnace may also be charged. These mentioned above may be used alone, or at least two thereof may be used in combination.

In order to form the carbon material suspension slag layer and the carbon material covering layer, and in order to adjust the components and the temperatures of the molten iron and the slag, various types of raw materials are preferably charged while the solid reduced iron B is melted.

In addition, in order to ensure the fluidity of the slag layer 12 and to facilitate desulfurization from the molten iron, the basicity $CaO/SiO_2$ (mass ratio) of the slag layer 12 is controlled preferably in the range of 0.8 to 2.0 and more preferably in the range of 1.0 to 1.6 (see FIG. 3 of the example described later).

In addition, a secondary combustion rate can be controlled to a recommendation value (40% or less, more preferably 10% to 35%, and even more preferably 15% to 30%) by adjusting the flow rate of a top-blown oxygen gas D and/or the height of the top-blown lance 5, and hence without excessively increasing a thermal load to a refractory of the iron bath type melting furnace 1, the carbon material consumption amount can be decreased. The secondary combustion rate is a value obtained by the following equation using the amounts of individual gas components discharged from the melting furnace.

$$\text{Secondary combustion rate} = 100 \times (CO_2 + H_2O)/(CO + CO_2 + H_2 + H_2O)$$

The flow rate of the bottom-blown nitrogen gas (inert gas A) is preferably adjusted in the range of 0.02 to 0.20 $Nm^3$/(min·t–molten iron layer) in order to ensure the melting rate of the solid reduced iron B by sufficiently stirring the molten iron layer 11.

In addition, by blowing the oxygen gas (oxygen-containing gas E) from an upper side, the slag layer 12 receives a stirring effect, and together with a stirring effect of the molten iron layer 11 by the bottom-blown nitrogen gas (inert gas A), the melting of the solid reduced iron B into the molten iron layer 11 and the carburization by the carbon material C in the molten iron layer 11 are facilitated at the interface between the molten iron layer 11 and the slag layer 12. In a conventional process for producing molten iron using an iron bath type melting furnace in which the carbon material suspension slag layer 13 is not formed, since decarburization of molten iron is preferentially performed by oxygen blowing to carburization of the molten iron, it is difficult to produce high-carbon molten iron; however, according to the present invention, since the carburization is facilitated by the presence of the carbon material suspension slag layer 13, the production of high-carbon molten iron can be performed. The carbon content in the molten iron is preferably 3 mass percent or more and is more preferably 3.5 to 4.5 mass percent. In accordance with the above, the iron content in the slag layer 12 is preferably decreased to approximately 10 mass percent or less, more preferably to approximately 5 mass percent or less, and even more preferably to approximately 3 mass percent or less. The reasons for this are that when the iron content in the slag layer 12 is decreased, desulfurization from the molten iron layer 11 is facilitated, and in addition, the melted damage of a furnace lining refractory by molten FeO can also be reduced.

[Slag Discharge Step]

When the melting operation is continued for a predetermined time as described above, a predetermined amount (such as an amount for one tapping) of slag is accumulated in the iron bath type melting furnace 1. Subsequently, slag discharge is performed. As in the case of slag discharge in a blast furnace, in this slag discharge, the taphole 9 is opened by a drill while the furnace is erected without being tilted, and the molten iron is first discharged until the bath surface reaches the level of the taphole 9. Subsequently, the slag discharge is performed. Since the molten iron having a large heat capacity is first discharged, the taphole 9 is warmed; hence, although the slag is then sequentially discharged, the taphole 9 is prevented from being clogged by solidification of the slag. In addition, in order to more reliably prevent the solidification of the slag, the molten iron discharge temperature (also called tapping temperature) is preferably set to 1,450° C. or more and more preferably set to 1,500° C. or more (see FIG. 4 of the example described later).

Furthermore, since the foaming is prevented in the furnace by the presence of the carbon material suspension slag layer 13, and the density of the slag is maintained high, the heat capacity of the slag is maintained high in the slag discharge, and the temperature of the slag is maintained in the furnace by the presence of the carbon material covering layer 14. Hence, the top blowing of an oxygen gas can be continued in the slag discharge, and even if the blowing is interrupted or the amount of the gas is decreased, the slag is prevented from being cooled and solidified.

Subsequently, when the carbon material starts to be discharged from the taphole 9 with the slag, that is, when the carbon material suspension slag layer 13 starts to be discharged, the slag discharge is finished, and the taphole 9 may then be closed by mud.

Accordingly, since the carbon material suspension slag layer 13 and the carbon material covering layer 14 remain in the furnace, also in a subsequent melting operation, the foaming of slag is prevented, and a heat-retention effect can be reliably maintained.

As described above, when the process for producing molten iron according to the embodiment of the present invention is repeatedly performed, while the slag foaming is prevented, a smooth and rapid slag discharge operation can be repeatedly performed. In addition, the slag discharge operation can be performed while the furnace is erected without tilting the furnace, even in the slag discharge operation, the blowing (melting operation) can be continued. Hence, by the process for producing molten iron according to the embodiment of the present invention, the productivity of molten iron can be improved.

[Repair Step]

In the process for producing molten iron according to the embodiment of the present invention, since the bottom-blown tuyeres 7 are used, for example, melted damage and clogging of the tuyeres 7 and wear damage done to a hearth bottom refractory located therearound occur, and hence a periodical inspection/repair operation is required. Accordingly, as in the case of a conventional converter, a molten iron discharge port not shown in the figure is provided at an upper portion of the iron bath type melting furnace 1, and after the iron bath type melting furnace 1 is tilted, for example, once per several days to discharge remaining molten iron and remaining slag through the molten iron discharge port and the top of furnace 2, respectively, so as to make the furnace empty, an inspection/repair operation is preferably performed.

For re-startup after the inspection/repair operation is completed, for example, the remaining molten iron discharged from the furnace before the above operation may be stored in another ladle or the like to maintain the temperature of the molten iron and may again be charged in the furnace as hot heel. In addition, when the remaining slag is discharged, although the slag and the base metal adhere to the surface of a refractory inner wall of the furnace, since the carbon material in the carbon material suspension slag layer 13 and that in the carbon material covering layer 14 cover the surface of the above adherent layer, the slag and the base metal are prevented from being oxidized in the inspection/repair operation even if the furnace is heated by a burner to maintain the temperature thereof, and hence bumping which occurs when the hot heel is charged for the re-startup and slag foaming which occurs in subsequent blowing can be prevented.

Modified Example

In the embodiment described above, although the case in which the discharge of the remaining slag in the repair of the iron bath type melting furnace 1 is performed through the top of furnace 2 or the like by tilting the furnace is described by way of example, an end taphole not shown in the figure may be provided at the lowest portion of the furnace side 8 to discharge the remaining slag through the end taphole without tilting the iron bath type melting furnace or by tilting the furnace at an angle of 20° or less as in the case of an arc electrical furnace or the like. Accordingly, the installation space of the furnace necessary for the furnace tilting can be saved, and in addition, the time necessary for the furnace tilting can also be shortened. In addition, a periodical inspection/repair operation in this case may be performed after the remaining slag is discharged through the end taphole without tilting the iron bath type melting furnace or by tilting the furnace at an angle of 20° or less.

In the embodiment described above, although the case in which only one taphole 9 is provided is described by way of example, since the level of the bottom surface in the furnace is lowered concomitant with the melted damage of a furnace refractory, a plurality of tapholes is preferably provided in a furnace height direction. In addition, the tapholes 9 may be provided at a plurality of positions in a horizontal circumference direction of the furnace, such as in a direction of 180°, a direction of 90°, and a direction of 120°.

In the embodiment described above, although the solid reduced iron B produced in the rotary hearth furnace is described by way of example, solid reduced iron produced in a linear furnace or a rotary kiln may also be used.

In the embodiment described above, although the case in which the dropping method using the gravity is used to charge the carbon material C and the additive flux D into the furnace is described by way of example, for example, after being pulverized into fine particles, the carbon material C and the additive flux D may be directly blown into the slag layer. However, in order to reduce the equipment cost and the operation cost, the dropping method using the gravity is preferably used.

In the embodiment described above, although the case in which only one top-blown lance 5 is provided is described by way of example, in accordance with the size of the furnace and the shape thereof, a plurality of top-blown lances may also be provided.

In the embodiment described above, although an oxygen gas is described by way of example as the oxygen-containing gas E, oxygen-rich air may also be used.

In the embodiment described above, although a nitrogen gas ($N_2$) is described by way of example as the bottom-blown inert gas A, an argon (Ar) gas, a carbon monoxide (CO) gas, a carbon dioxide ($CO_2$) gas, or a mixed gas containing at least two thereof may also be used.

EXAMPLES

In order to verify the effect of the present invention, a test for melting solid reduced iron was performed using a vertical reaction furnace having a refractory inside diameter of 2 m and an in-furnace effective height of 2.6 m.

As the solid reduced iron, solid reduced iron having a component composition shown in Table 1 was used which was obtained by the steps of performing heating reduction of carbon composite iron oxide pellets, which were formed using steel plant dust as an iron-oxide raw material, in a rotary hearth furnace, and then performing cooling to room temperature. As the carbon material, a coke powder and smokeless coal having component compositions shown in Table 2 were used. As the additive flux, calcined lime and dolomite were used. In addition, as the bottom-blown inert gas, a nitrogen gas was used, and as the top-blown oxygen-containing gas, an oxygen gas was used.

TABLE 1

| ITEM | UNIT | REDUCED IRON (1) | REDUCED IRON (2) | REDUCED IRON (3) | REDUCED IRON (4) |
|---|---|---|---|---|---|
| PARTICLE DIAMETER COMPONENT | | +6.7 mm 75% | +6.7 mm 93% | +3.35 mm 64% | +3.35 mm 65% |
| T·Fe | MASS % | 75.6 | 81.1 | 58.1 | 35.4 |
| FeO | MASS % | 8.0 | 16.8 | 13.2 | 12.2 |
| GANGUE COMPONENT | MASS % | 6.8 | 7.1 | 23.8 | 36.3 |
| C | MASS % | 10.5 | 4.2 | 7.2 | 3.1 |
| S | MASS % | 0.13 | 0.08 | 0.6 | 0.6 |
| METALLIZATION RATIO | % | 91.8 | 83.9 | 82.4 | 73.2 |

TABLE 2

| ITEM | UNIT | COKE POWDER | SMOKELESS COAL |
|---|---|---|---|
| PARTICLE DIAMETER INDUSTRIAL ANALYTICAL VALUE | | +12 mm | +6 mm |
| VOLATILE COMPONENT | MASS % | 0.5 | 6.6 |
| ASH | MASS % | 12.8 | 13.9 |
| FIXED CARBON ELEMENT ANALYTICAL VALUE | MASS % | 86.7 | 79.5 |
| C | MASS % | 85.1 | 81.5 |
| H | MASS % | 0.1 | 1.3 |
| N | MASS % | 1.1 | 0.3 |
| O | MASS % | 0.4 | 3.0 |
| S | MASS % | 0.6 | 0.2 |

Example 1

In the startup, after a hot heel was charged into the vertical reaction furnace, and a predetermined amount of the carbon material was charged, the charge of raw materials (the reduced iron (1) and (2) shown in Table 1, the carbon material, and the additive flux) and blowing were started. In addition, a carbon material suspension slag layer and a carbon material covering layer were formed in the furnace, so that melting and slag discharge were controlled. In this example, the discharge temperature was 1,568° C., the basicity of slag ($CaO/SiO_2$) was 1.28, and the slag discharging factor was 1.66.

Example 2

Next, the charge of the raw materials and the blowing were started as in Example 1 except that the charge amount of the carbon material was changed, and the carbon material suspension slag layer and the carbon material covering layer were formed in the furnace, so that the melting and the slag discharge were controlled. In this example, the discharge temperature was 1,489° C., the basicity of slag ($CaO/SiO_2$) was 0.91, and the slag discharging factor was 1.65.

Example 3

Next, the charge of the raw materials and the blowing were started as in Example 1 except that the reduced iron was changed to the reduced iron (1), (2), and (3) in Table 1, and the carbon material suspension slag layer and the carbon material covering layer were formed in the furnace, so that the melting and the slag discharge were controlled. In this example, the discharge temperature was 1,551° C., the basicity of slag ($CaO/SiO_2$) was 0.89, and the slag discharging factor was 1.38.

Example 4

Next, the charge of the raw materials and the blowing were started as in Example 1 except that the reduced iron was changed to the reduced iron (4) in Table 1, and the carbon material suspension slag layer and the carbon material covering layer were formed in the furnace, so that the melting and the slag discharge were controlled. In this example, the discharge temperature was 1,529° C., the basicity of slag ($CaO/SiO_2$) was 0.94, and the slag discharging factor was 1.81.

Comparative Example 1

Next, for the re-startup, after the hot heel was charged into the vertical reaction furnace, the charge of raw materials (the reduced iron (3) shown in Table 1, the carbon material, and the additive flux) and the blowing were started. As the charge amount of the carbon material, only an amount necessary for melting of the reduced iron was charged into the furnace. In addition, while only the basicity of slag and the discharge temperature were adjusted, the melting and the slag discharge were controlled. In this comparative example, the discharge temperature was 1,503° C., the basicity of slag ($CaO/SiO_2$) was 0.97, and the slag discharging factor was 0.85.

Comparative Example 2

Next, the charge of the raw materials and the blowing were started as in Comparative Example 1 except that the reduced iron was changed to the reduced iron (3) and (4) in Table 1, and while only the basicity of slag and the discharge temperature were adjusted, the melting and the slag discharge were controlled. In addition, as the charge amount of the carbon material, only an amount necessary for melting of the reduce iron was charged into the furnace. In this comparative example, the discharge temperature was 1,518° C., the basicity of slag ($CaO/SiO_2$) was 1.26, and the slag discharging factor was 1.00.

Comparative Example 3

Next, the charge of the raw materials and the blowing were started as in Comparative Example 1 except that the reduced iron was changed to the reduced iron (4) in Table 1, and while only the basicity of slag and the discharge temperature were adjusted, the melting and the slag discharge were controlled. In addition, as the charge amount of the carbon material, only an amount necessary for melting of the reduce iron was charged into the furnace. In this comparative example, the discharge temperature was 1,543° C., the basicity of slag ($CaO/SiO_2$) was 1.06, and the slag discharging factor was 1.05.

In addition, in the examples and the comparative examples described above, when the melting was performed, the secondary combustion rate was controlled in the range of 20% to 30%.

In Examples 1 to 4, during a continuous operation for 8 hours, troubles caused by the slag foaming were not generated at all, and a stable operation could be continuously performed. On the other hand, in Comparative Examples 1 to 3, since the charge amount of the carbon material was small, the carbon material suspension slag layer and the carbon material covering layer were not formed until the slag is discharged. In addition, in the Comparative Examples 1 to 3, within 10 to 15 minutes after the blowing was started, troubles, such as clogging of an exhaust gas system, caused by the slag foaming were generated, and as a result, the operation was inevitably interrupted.

Figure 3:
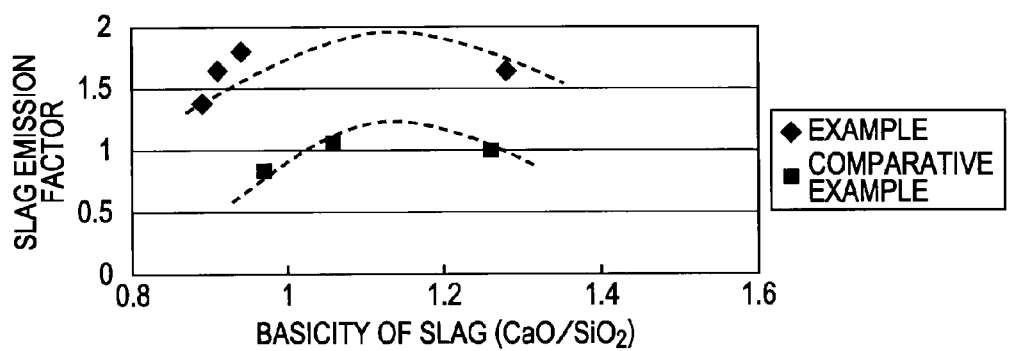
FIG. 3 is a graph showing the relationship between the basicity of slag and a slag discharging factor.
Figure 4:
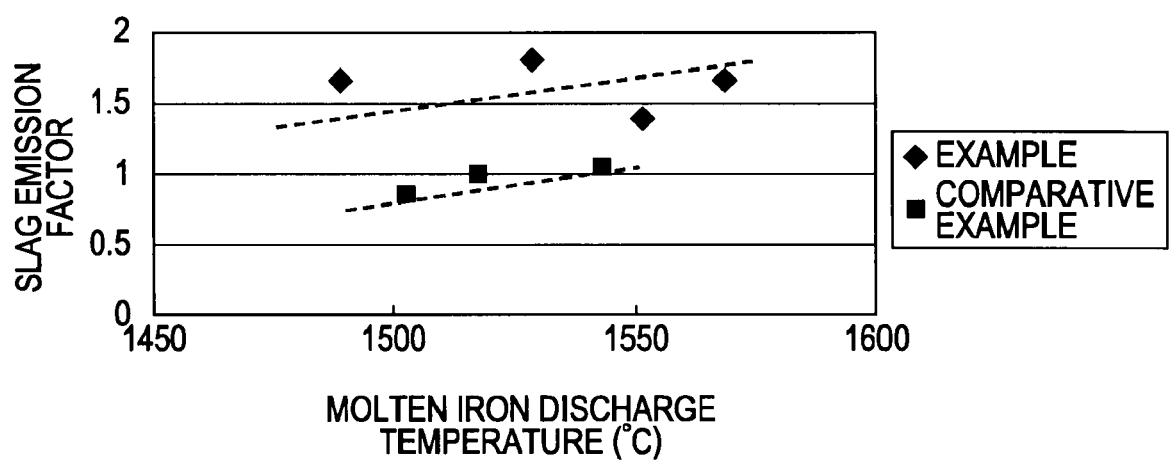
FIG. 4 is a graph showing the relationship between a molten iron discharge temperature and the slag discharging factor.

In addition, as shown in FIGS. 3 and 4, in Comparative Examples 1 to 3, even when the basicity of slag and the discharge temperature were controlled, the slag discharging factor (that is, the mass ratio of the slag discharge amount to the slag production amount) remains low, such as approximately 1.1 at the most; however, on the other hand, it was found that in Examples 1 to, when the basicity of slag and the discharge temperature were appropriately controlled, a high slag discharging factor, such as 1.7 to 1.8, could be obtained.

As has thus been described in detail, the present invention relates to a process for producing molten iron in which while an inert gas is blown into a molten iron layer in an iron bath type melting furnace through bottom-blown tuyeres provided in a hearth bottom thereof to stir the molten iron layer, a carbon material, an additive flux, and solid reduced iron which is obtained by heating reduction of carbon composite iron oxide briquettes are charged into the above melting furnace, and top blowing of an oxygen-containing gas is performed through a top-blown lance provided for the melting furnace, so that the solid reduced iron is melted by combustion heat obtained by combusting the carbon material and/or carbon in molten iron to form molten iron. In addition, in this process for producing molten iron, the carbon material is charged so as to form a carbon material suspension slag layer in which the carbon material is suspended at an upper layer portion of a slag layer which is formed of slag generated when the solid reduced iron on the molten iron layer is melted into molten iron and further so as to form a carbon material covering layer made of only the carbon material on the carbon material suspension slag layer, and the molten iron and the slag accumulated in the melting furnace are discharged through a taphole provided at a lower portion of a furnace side of the melting furnace.

According to the present invention, an iron bath type melting furnace (vertical reaction furnace) having a taphole at a lower portion of a furnace side is used, and while bottom-blown gas stirring is used, a carbon material is charged so as to form a carbon material suspension slag layer in which the carbon material is suspended at an upper layer portion of a slag layer formed of slag on a molten iron layer in the furnace and further so as to form a carbon material covering layer made of only the carbon material on the carbon material suspension slag layer. Accordingly, since the iron oxide concentration of slag in the carbon material suspension slag layer formed at the upper layer portion of the slag layer is decreased, the generation rate of bubbles of a carbon monoxide gas which causes the foaming is decreased, and since the carbon material suspended in this carbon material suspension slag layer improves the permeability of a carbon monoxide gas in the slag (that is, carbon monoxide-gas bubbles are likely to be released from the slag layer), the foaming is not likely to occur. In addition, since the carbon material covering layer formed on the carbon material suspension slag layer maintains the temperature of the slag layer, and the slag is prevented from being cooled and solidified in the taphole in the slag discharge, without tilting the furnace, that is, while the furnace is erected, a smooth and rapid slag discharge operation can be performed. In addition, since the carburization of the molten iron is facilitated by the carbon material suspension slag layer, production of high-carbon molten iron can be performed. As a result, a process for producing high carbon-containing molten iron which has superior stability and productivity can be realized at low cost by blowing of an oxygen-containing gas.

In this process for producing molten iron, among the solid reduced iron, the carbon material, and the additive flux, a predetermined amount of the carbon material is preferably first charged. When a predetermined amount of the carbon material is charged before the solid reduced iron is charged into the iron bath type melting furnace, the carbon material suspension slag layer is likely to be formed from the initial melting stage. Accordingly, the slag foaming can be more reliably prevented.

In this process for producing molten iron, as the charge amount of the carbon material, the total of the carbon material in the carbon material suspension slag layer and that of the carbon material covering layer is preferably in the range of 100 to 1,000 kg with respect to 1,000 kg of slag in the slag layer at the start of the molten iron discharge. When the charge amount of the carbon material is set in the range described above, the decrease in melting rate of the solid reduced iron and the generation of slag foaming can be more reliably prevented, and in addition, a smoother and more rapid slag discharge operation can be performed.

In this process for producing molten iron, when the carbon material starts to be discharged with the slag through the taphole, the discharge of the slag is preferably stopped. When the discharge of the slag is stopped when the carbon material starts to be discharged, the carbon material suspension slag layer and the carbon material covering layer remain in the furnace; hence, in subsequent production of molten iron, the prevention of the slag foaming and the heat retention of the slag can be more reliably performed.

In this process for producing molten iron, it is preferable that the melting furnace has a top of furnace at an upper portion thereof and is provided with an exhaust gas duct above the top of furnace, the exhaust gas duct has a skirt movable up and down at an lower end portion thereof, and the skirt covers an upper side of the top of furnace without being in close contact therewith so that the top of furnace and the exhaust gas duct are connected to each other. When a gap with the top of furnace is adjusted by moving the skirt up and down so as to discharge a furnace gas or introduce air through the gap, the change in furnace pressure is suppressed, and the generation of slag foaming caused by this change in furnace pressure can be more reliably prevented. In addition, even if the slag overflows from the top of furnace by abnormal slag foaming, since the slag only spills outside through the gap, more serious equipment damages, such as clogging of an exhaust gas system and damage done thereto, can be avoided.

In this process for producing molten iron, it is preferable that the melting furnace has a molten iron discharge port at an upper portion thereof and that the repair of the melting furnace is performed after remaining molten iron and remaining slag are discharged through the molten iron discharge port and the top of furnace, respectively, by tilting the furnace. Since the wear damages done to the tuyeres and the furnace wall of the melting furnace are repaired after the remaining molten iron and the remaining slag are discharged through the molten iron discharge port and the top of furnace, respectively, by tilting the furnace, the repair operation can be performed in a manner similar to that for a conventional converter.

In this process for producing molten iron, it is preferable that the melting furnace has an end taphole at the lowest portion of the furnace side thereof and that the repair of the melting furnace is performed after the remaining slag is discharged through the end taphole without tilting the melting furnace or by tilting the melting furnace at an angle of 20° or less. Since the wear damages done to the tuyeres and the furnace wall of the melting furnace are repaired after the remaining slag is discharged through the end taphole without tilting the melting furnace or by tilting the melting furnace at a small angle, the installation space of the furnace necessary for the furnace tilting can be saved, and the time necessary for the furnace tilting can also be shortened.

INDUSTRIAL APPLICABILITY

When the process of producing molten iron of the present invention is used, by blowing of an oxygen-containing gas, high carbon-containing molten iron can be stably produced at a low cost.

The invention claimed is:

1. A process for producing molten iron comprising: blowing an inert gas into a molten iron layer in an iron bath melting furnace through bottom-blown tuyeres provided in a hearth bottom thereof to stir the molten iron layer; charging solid reduced iron, a carbon material, and an additive flux into the melting furnace, wherein the solid reduced iron is obtained by heating reduction of carbon composite iron oxide briquettes; performing top blowing of an oxygen-containing gas through a top-blown lance provided for the melting furnace; and obtaining molten iron by melting the solid reduced iron by combustion heat generated by combusting at least one of the carbon material and carbon in molten iron, wherein the carbon material is charged to form a carbon material suspension slag layer in which the carbon material is suspended at an upper layer portion of a slag layer comprising slag generated when the solid reduced iron on the molten iron layer is melted into molten iron and further to form a carbon material covering layer consisting essentially of the carbon material on the carbon material suspension slag layer, and the molten iron and the slag accumulated in the melting furnace are discharged through a taphole provided at a lower portion of a furnace side of the melting furnace.

2. The process for producing molten iron according to claim 1,
wherein among the solid reduced iron, the carbon material, and the additive flux, a predetermined amount of the carbon material is first charged.

3. The process for producing molten iron according to claim 2,
wherein as the charge amount of the carbon material with respect to 1,000 kg of slag in the slag layer at the start of molten iron discharge, the total of the carbon material in the carbon material suspension slag layer and the carbon material of the carbon material covering layer is 100 to 1,000 kg.

4. The process for producing molten iron according to claim 1,
wherein when the carbon material starts to be discharged through the taphole together with slag, the discharge of slag is stopped.

5. The process for producing molten iron according to claim 1,
wherein the melting furnace has a top of furnace at an upper portion thereof and is provided with an exhaust gas duct above the top of furnace,
the exhaust gas duct has a skirt movable up and down at a lower end portion thereof, and
the skirt covers an upper side of the top of furnace without being in close contact therewith, so that the top of furnace and the exhaust gas duct are connected to each other.

6. The process for producing molten iron according to claim 1,
wherein the melting furnace has a molten iron discharge port at an upper portion thereof, and
the melting furnace is repaired after remaining molten iron and remaining slag are discharged through the molten iron discharge port and the top of furnace, respectively, by tilting the melting furnace.

7. The process for producing molten iron according to claim 1,
wherein the melting furnace has an end taphole at the lowest portion of a furnace side thereof, and
the melting furnace is repaired after remaining slag is discharged through the end taphole without tilting the melting furnace or by tiling the melting furnace at an angle of 20° or less.

* * * * *